United States Patent
Acker et al.

[11] Patent Number: 5,522,079
[45] Date of Patent: May 28, 1996

[54] COMPILER MERGING NEW AND PREEXISTING MODULES WHILE PRESERVING FUNCTION ORDER

[75] Inventors: Liane E. Acker; Andrew R. Martin; Larry K. Raper, all of Austin, Tex.

[73] Assignee: International Business Machines Corporation, Armonk, N.Y.

[21] Appl. No.: 432,661

[22] Filed: May 2, 1995

Related U.S. Application Data

[63] Continuation of Ser. No. 77,351, Jun. 14, 1993, abandoned.

[51] Int. Cl.$^6$ .................................. G06F 9/45; G06F 1/00
[52] U.S. Cl. .................. 395/700; 364/262.4; 364/228.3; 364/240.2; 364/DIG. I; 364/DIG. II
[58] Field of Search .............................. 395/700; 364/300, 364/200

[56] References Cited

U.S. PATENT DOCUMENTS

| | | | |
|---|---|---|---|
| 4,321,070 | 3/1982 | Timmons | 354/300 |
| 4,463,423 | 7/1984 | Potash et al. | 364/300 |
| 4,558,413 | 12/1985 | Schmidt et al. | 364/300 |
| 4,853,843 | 8/1989 | Ecklund | 364/200 |
| 4,912,637 | 3/1990 | Sheedy et al. | 364/300 |
| 4,916,610 | 4/1990 | Bapat | 364/300 |
| 4,965,724 | 10/1990 | Utsumi et al. | 364/200 |
| 5,084,815 | 1/1992 | Mazzario | 395/800 |
| 5,107,423 | 4/1992 | Sasaki et al. | 354/419 |
| 5,142,681 | 8/1992 | Driscoll et al. | 395/700 |
| 5,261,103 | 11/1993 | Takeuchi et al. | 395/700 |
| 5,287,548 | 2/1994 | Flood et al. | 395/375 |
| 5,339,431 | 8/1994 | Rupp et al. | 395/700 |
| 5,359,539 | 10/1994 | Matsumoto et al. | 364/489 |
| 5,367,684 | 11/1994 | Smith | 395/700 |

OTHER PUBLICATIONS

The Common Object Request Broker Architecture, pp. 27–160.

*Primary Examiner*—Kevin A. Kriess
*Assistant Examiner*—Majid A. Banankhah
*Attorney, Agent, or Firm*—Jeffrey S. LaBaw

[57] ABSTRACT

A compiler which merges two output files into a third output file. First, the compiler generates a new output file by compiling an input file. Next, the compiler searches for an existing output file for a substantially similar purpose as the new output file, i.e. the preexisting implementation file. The code modules from the new and existing output files are then interleaved to preserve the sequence of related code modules.

14 Claims, 8 Drawing Sheets

STRUCTURE OF THE SOM COMPILER

COMPILER MERGING NEW AND PREEXISTING MODULES WHILE PRESERVING FUNCTION ORDER

DESCRIPTION

This is a continuation of application Ser. No. 08/077,351 filed Jun. 14, 1993, now abandonded.

This invention is related to commonly assigned patent applications, Ser. Nos. 08/332,618 and 08/077,350, filed Jun. 14, 1993.

BACKGROUND OF THE INVENTION

The present invention relates generally to data processing systems. More particularly, it relates to systems to produce a plurality of different output files for programs.

The development of programming for data processing systems has traditionally been a time consuming task. Object oriented programming (OOP) has emerged as a promising new technology which will allow more efficient development reuse and customization of new software programming. Object oriented programming shifts the emphasis of software development away from function decomposition and towards the recognition of units of software called "objects" which both encapsulate data and function. As a result, programs become easier to maintain and enhance.

Yet despite its promise, object oriented technology has not penetrated major commercial software products to date. This is due in part because of the obstacles which the developer must confront when utilizing object oriented programming. A first obstacle that developers must confront is the choice of which object oriented programming language to use. The early expressions of object oriented programming concept focused on the creation of tool kits and languages, each of which are designed to exploit some particular aspect of OOP. So called, pure object oriented languages such as SmallTalk use a run time environment which will operate smoothly and consistently so long as the developer works within the supplied environment. However, when interacting with foreign environments, the objects must be reduced to data structures which do not retain the advantages which objects offer with regard to encapsulation and code use. Hybrid languages, such as C++ require less run time support, but can result in tight bindings between the programs which provide the objects and the clients which use them. Tight binding implies that the client programs must be recompiled whenever simple changes are made to the library. The second obstacle is the disparity in concept among the plurality of different object oriented languages; tool kits embrace different incompatible models of what objects are and how they work. The software developed using any particular language or tool kit is limited in scope. A program implemented in one language can rarely be used in another.

The System Object Module "SOM" is a new object oriented technology for building packaging and manipulating object oriented programs designed to unite various object oriented approaches. In SOM, the interfaces of the classes of Objects, together with the names of the method they support, the return types, the parameter types and so forth, are specified in a standard language called. the Interface Definition Language (IDL). The actual implementation of the object class can be performed in whatever programming language the developer prefers. The preferred programming language need not necessarily be an object oriented programming language, but might be a procedural language such as C. Thus, the advantages of object oriented programming can be extended to programmers non object oriented programming languages. SOM is described in greater detail in the OS/2 2.0 SOM *Guide and Reference* a publication of the IBM Corporation, which is hereby incorporated by reference.

The SOM compiler translates the IDL interface specification into a variety of different output forms. The interface definition can be translated into a programming language binding file an implementation template file, a documentation file, a description that can drive a class browser or a printed interface specification. The structure of the SOM compiler is divided into an IDL parser which understands the interface definition in IDL and translates in an abstract syntax graph an intermediate language. It also includes an emitter which translates intermediate language to the desired output form. A plurality of different output forms are supported by having interchangeable emitters, however, to date each emitter must be programmed by hand, which is a laborious and time consuming effort.

One of tile problems occurs in SOM when a developer wishes to add new methods or change existing ones or change the interface to an already existing class. The SOM compiler can not simply generate a new implementation file for the existing implementation code would be lost. Instead, the compiler must somehow merge the existing implementation file with the newly generated one while preserving programmer added code and the order of functions within the implementation files.

This invention teaches technique for automatically merging two compiler generated files.

It is therefore an object of the invention to merge two compiled files generated for substantially identical purposes.

It is another object of the invention to preserve the order in which modules occur in the two files.

It is another object of the invention to preserve programmer added code in the merged file.

SUMMARY OF THE INVENTION

These and other objects are accomplished by a compiler which merges two output files into a third output file. First, the compiler generates a new output file, for example, an implementation file, by compiling an input file, for example, an IDL interface defintion file. Next, the compiler searches for an existing output file for a substantially similar purpose as the new output file, i.e, the preexisting implementation file. The code modules from the new and existing output files are then interleaved to preserve the sequence of related code modules.

The interleaving process compares the sequence of module names as they appear in the existing file with a list of module names which appear in both the existing file and the new file. The list is made by searching the existing and the new files to produce a list of module names corresponding to and according to the order in which the modules appear in the new file, and marking the names in the list which correspond to modules which appear in both the existing and new files. Next, it transfers a first module from the existing file to the third file if a corresponding first module name does not appear in the list. If a second module name is found in both the existing file and the list, the corresponding second module in the existing and new files are compared and the unique portions of both the second modules are transferred to the third file. Next, a set of modules which follow the second module from the new file are transferred to the third file until a module whose name occurs in both the existing and new files is encountered.

It is another object of the invention to divide the control language of the compiler into small, easily maintained and reusable components.

BRIEF DESCRIPTION OF THE DRAWINGS

These and other features, advantages and objects will be more easily understood with references to the following description and attached drawings.

DETAILED DESCRIPTION OF THE DRAWINGS

The invention may be run on a variety of computers or collection of computers under a number of different operating systems. The computer could be, for example, a personal computer, a mini computer, mainframe computer or a computer running in a distributed network of other computers. Although the specific choice of computer is limited only by disk and disk storage requirements, computers in the IBM PS/2™ series of computers could be used in the present invention. For additional information on IBM's PS/2 series of computers, the reader is referred to *Technical Reference Manual Personal Systems/2 Model* 50, 60 systems IBM Corporation, Part No. 68X2224 Order No. S68X-2224 and *Technical Reference_ Manual Personal Systems/2 (Model* 80). IBM Corporation Part No. 68X2256 Order No. S68X-2254. One operating system which an IBM PS/2 personal computer may run is IBM's OS/2 2.0™. For more information on the IBM OS/2 2.0 Operating System, the reader is referred to *OS/2 2.0 Technical Library, Programming Guide,* Vols. 1, 2, 3 Version 2.00 Order No. 10G6261, 10G6495, 10G6494.

In the alternative, the computer system might be in the IBM RISC System/6000™ line of computers which run on the AIX™ operating system. The various models of the RISC System/6000 are described in many publications of the IBM Corporation, for example, *RISC System/6000, 7073 and 7016 POWERstation and POWERserver Hardware Technical Referecne,* Order No. SA23-2644-00. The AIX operating system is described in *General Concepts and Procedures—AIX Version 3 for RISC System/6000,* Order No. SC23-2202-00, as well as other publications of the IBM Corporation.

Figure 1:
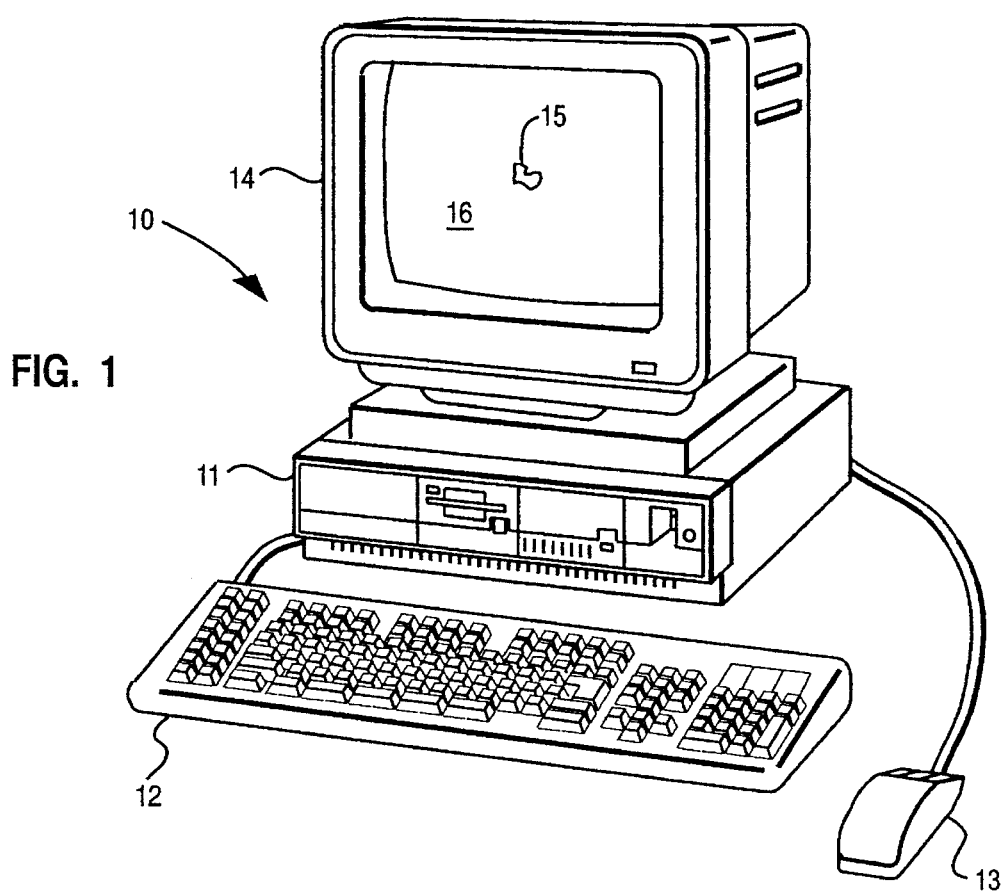
FIG. 1 depicts a computer system including system display, system unit, mouse and keyboard.

In FIG. 1, a computer 10, comprising a system unit 11, a keyboard. 12, a mouse 13 and a display 14 are depicted. The screen 16 of display device 14 is used to present the graphical user interface (GUI). The graphical user interface supported by the operating system allows the user to use a point and shoot method of input, i.e., by moving the mouse pointer 15 to an icon representing a data object at a particular location on the screen 16 and pressing one of the mouse buttons to perform a user command or selection.

Figure 2:
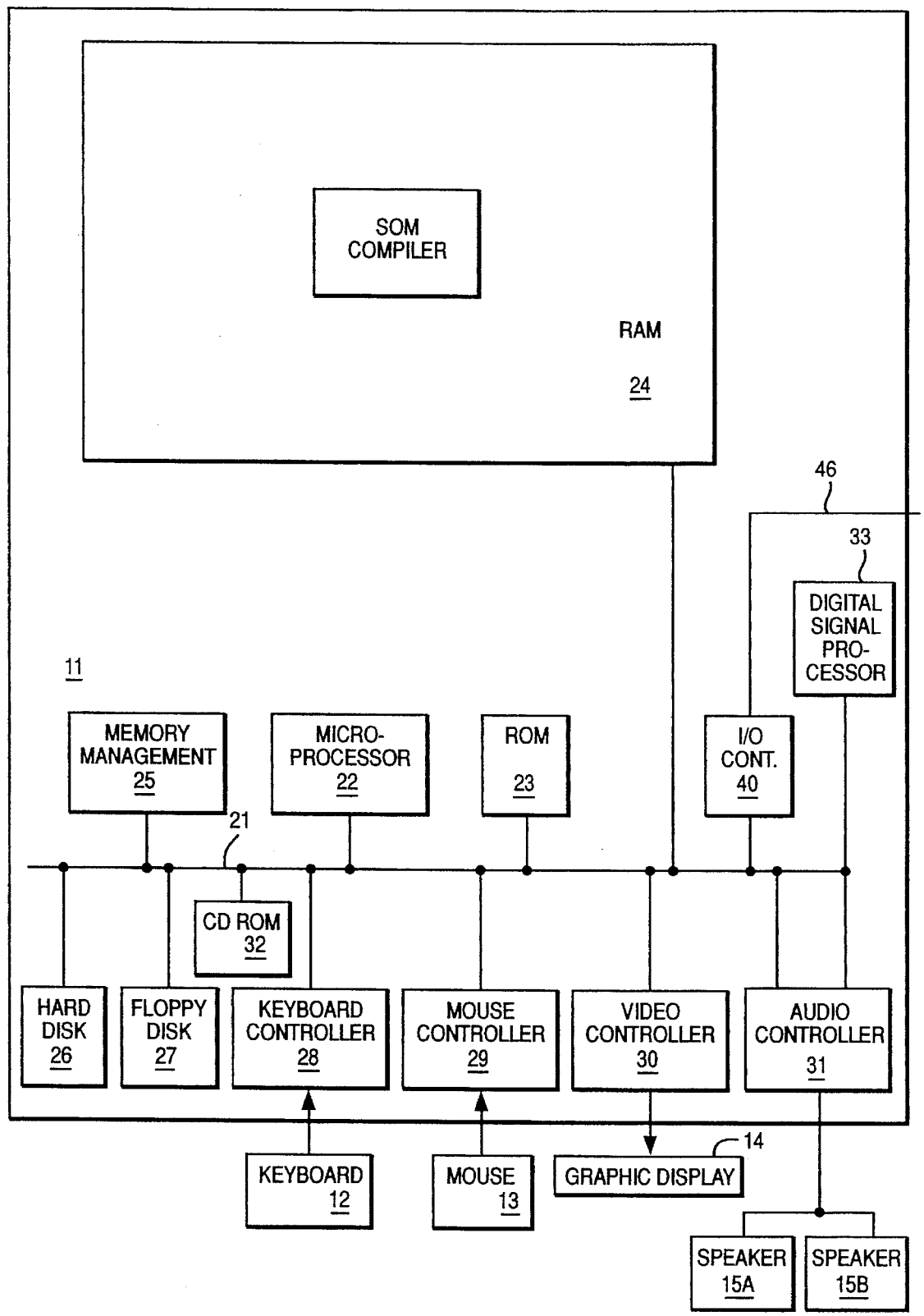
FIG. 2 is an architectural. block diagram of the computer system in FIG 1.

FIG. 2 shows a block diagram of the components of the personal computer shown in FIG. 1. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM multimedia PS/2 series of computers is one of the Intel family of microprocessors including the 386 or 486 microprocessors. However, other microprocessors including, but not limited to, Motorola's family of microprocessors such as the 68000, 68020 or the 68030 microprocessors and various Reduced Instruction Set computer (RISC) microprocessors manufactured by IBM, Hewlett Packard, Sun, Intel, Motorola and others may be used in the specific computer.

The ROM 23 contains among other code and Basic Input-Output system (BIOS) which controls basic hardware operations such as the interaction and the disk drives and the keyboard. The RAM 24 is the main memory into which the operating system and application programs are loaded. The memory management chip 25 is connected to the system bus 21 and controls direct memory access operations including, passing data between the RAM 24 and hard disk drives 26 and floppy disk drive 27. The CD ROM 32, also coupled to the system bus 21, is used to store a large amount of data, e.g., a multimedia program or large database.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15a and 15b. The speakers 15a and 15b may be used to present audio objects to the user. An I/O controller 40 such as a Token Ring Adapter enables communication over a network 46 to other similarly configured data processing systems.

One of the preferred implementations of the present invention is as several sets of instructions in a code module resident in the random access memory 24. Until required by the computer system, the sets of instructions may be stored in another computer memory, for example, in the hard disk drive 26, or in a removable memory such as an optical disk for eventual use in the CD ROM 32 or a floppy disk for eventual use in the floppy disk drive 27.

SOM is described in greater detail in copending and commonly assigned application Ser. No. 07/805,668 "Language Neutral Objects" filed May 4, 1992, to M. Conner et al, which is hereby incorporated by reference. SOM will be discussed in the present application only insofar as necessary to understand the present invention. Nonetheless, several facets of SOM are worth mentioning. Within SOM and other object oriented systems, each object has certain data attributes and methods which operate on the data. Data is said to be "encapsulated" by an object and can only be modified by the method which belongs to the object. Methods are typically invoked by sending a message to an object, identifying the desired method and supplying any needed arguments. Class Objects can be subclassed to create new class objects. "Inheritance" is the ability to derive a new object from an existing object inheriting all properties such as methods and data structure from the existing object. The new object may have certain unique features such as new methods which are added to or override existing methods of the existing class. A new subclass needs only specify the functions and data which distinguish it from its already existing base class. Thus, the software developer does not need to develop an entirely new piece of code. He or she need only specify the new unique features of the software.

Figure 3:
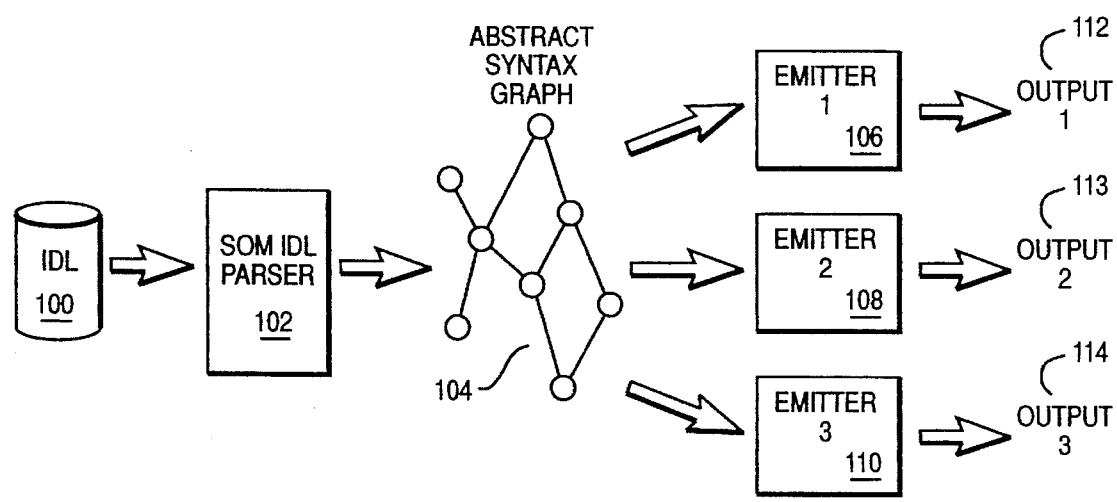
FIG. 3 is an illustration of the structure of a SOM compiler.

The SOM compiler helps developers build classes in which the interface and implementation are decoupled. The SOM compiler reads the IDL definition of a class interface and generates several different output files. As shown in FIG. 3, the SOM compiler takes an interface 100 for a class of objects written in one language, IDL, and translates the IDL interface description 100 into a variety of different output forms. The syntax and semantics of the Interface Definition Language (IDL) are described in Chapter Four of *The Common Object Request Broker: Architecture and Specification* published by the Object Management Group and X/Open which is hereby incorporated by reference, Those skilled in the art would recognize that other languages could be utilized to specify the interface. The interface 100 is parsed by the SOM IDL parser 102 into an abstract syntax graph 104, an intermediate data structure. In one preferred embodiment, each node of the abstract syntax graph 104 is a struct, a well known data structure in the C programming language, which represents a syntactic unit of the interface definition. The abstract syntax graph 104 can be sent to a number of different emitters 106, 108, 110 which produce a variety of different output forms 112, 113, 114. For example, the output forms can be a programming language binding file, an implementation template file, a documentation file, a description that can drive a class browser, a printed interface description, etc. Given the number of programming languages with which SOM can be used and the number of programming tools which can utilize object definitions, it is essential that a large number of output forms be produced. Therefore, it is important that the effort in developing and maintaining the emitter portions of the SOM compiler be minimized. As can be seen in the figure, for each output file, the only part of the SOM compiler that varies is the emitter or the back end.

The SOM Compiler generates from the IDL interface specification a "template implementation file", a C or C++ module consisting of "stub" method functions for each of the class's methods. The programmer adds application-specific code to each of the method functions in the template, yielding a complete class implementation. After a class implementation has been constructed by a programmer, the class interface may be extended or modified. For example, new methods may be added to the class, or the interface to existing methods may change. The SOM Compiler cannot simply generate a new implementation template, for then the existing implementation code would be lost. Instead, the SOM Compiler generates a new implementation template and automatically merges it with the existing implementation file, adding new "stub" method functions as needed and modifying the prototypes of existing method functions. Two important requirements for this merging are that programmer-added code must not be altered, and the order of functions in the existing implementation file must be preserved. The second requirement exists because method functions may be sensitive to neighboring preprocessor directives, so changing their positions might result in incorrect compilation.

The SOM Compiler first generates a new implementation template in either C or C++, as designated by the user. If no existing implementation file is found for that language, then the newly generated template becomes the implementation existing file and no further work is needed. If an implementation file already exists, then the newly generated template must be merged with the existing implementation. First, a pass is made through the newly generated template, during which the code is parsed enough so that functions can be distinguished from other programming constructs. Each function encountered is added to a linked list, so that at the end of the pass the program has constructed a list of function names occurring in the new template, in reverse order of occurrence. Second, a similar pass is made through the existing implementation file; for each function encountered, the program searches the previously constructed list of functions (the functions occurring in the template). If the function name is found on the list, it is marked as also occurring in the existing implementation file. At the end of this pass of the existing implementation file, the program has a list of function names occurring in the template file, and each name is marked according to whether or not it also occurs in the existing implementation file. This list is referred to below as "the method list". Third, another pass is made through the existing implementation file, during which the following operations are performed.

The SOM compiler whose process is discussed in detail below may be written according to the principles of the emitter framework described in the copending, commonly assigned applications referenced above which are hereby incorporated by reference. Alternatively, it can be written by hand by a programmer following the process flows described below.

Figure 4B:
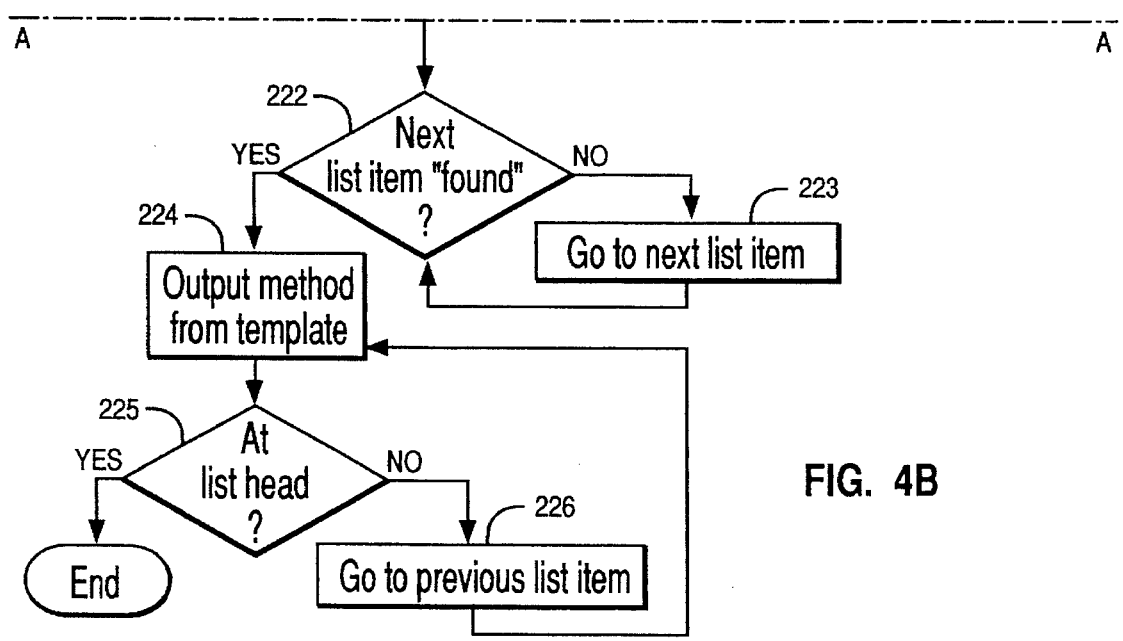
FIG. 4 consisting of 4A and 4B is a flow diagram of merging two C modules while preserving function order.
Figure 4A:
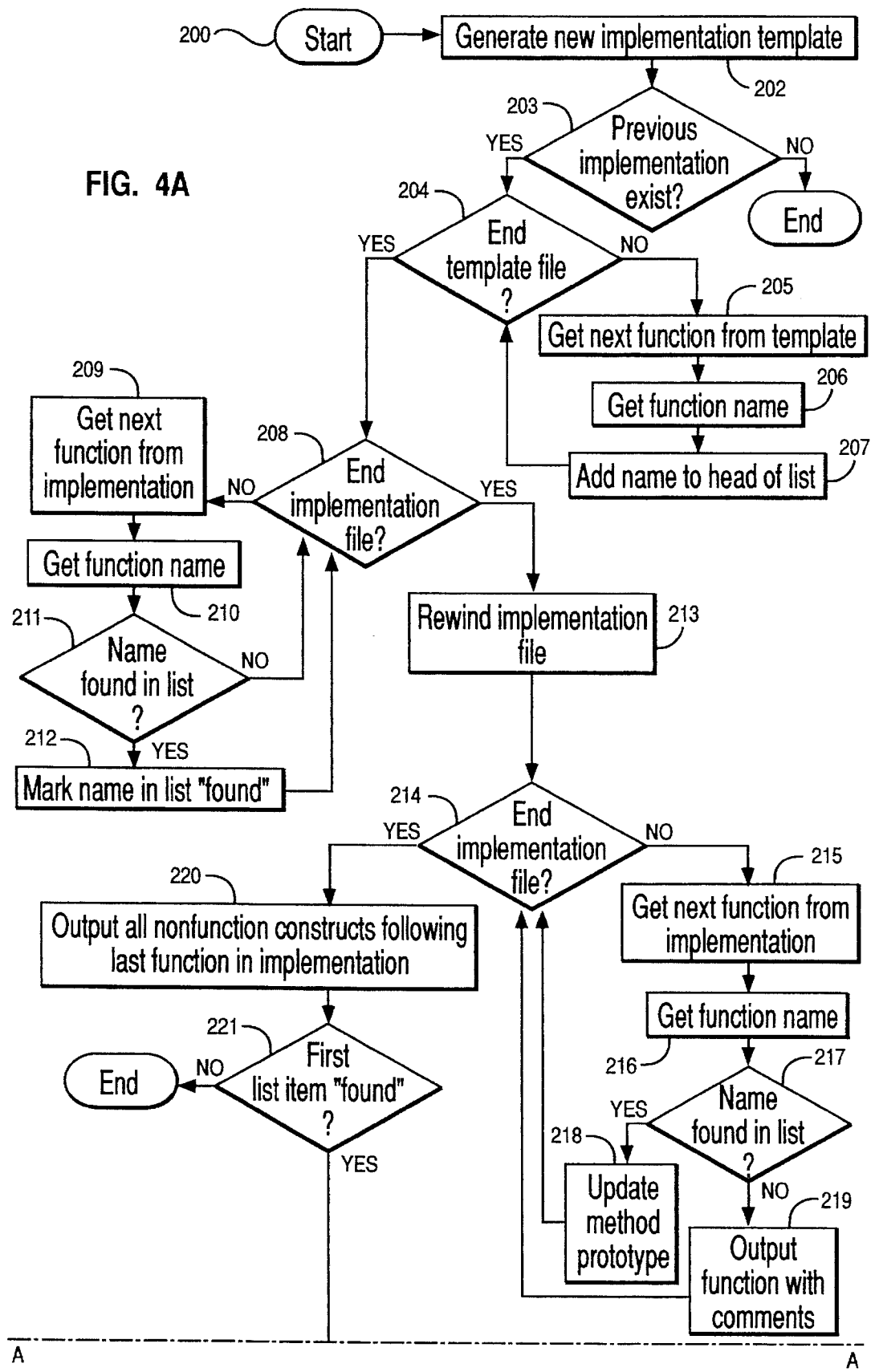
Figure 6:
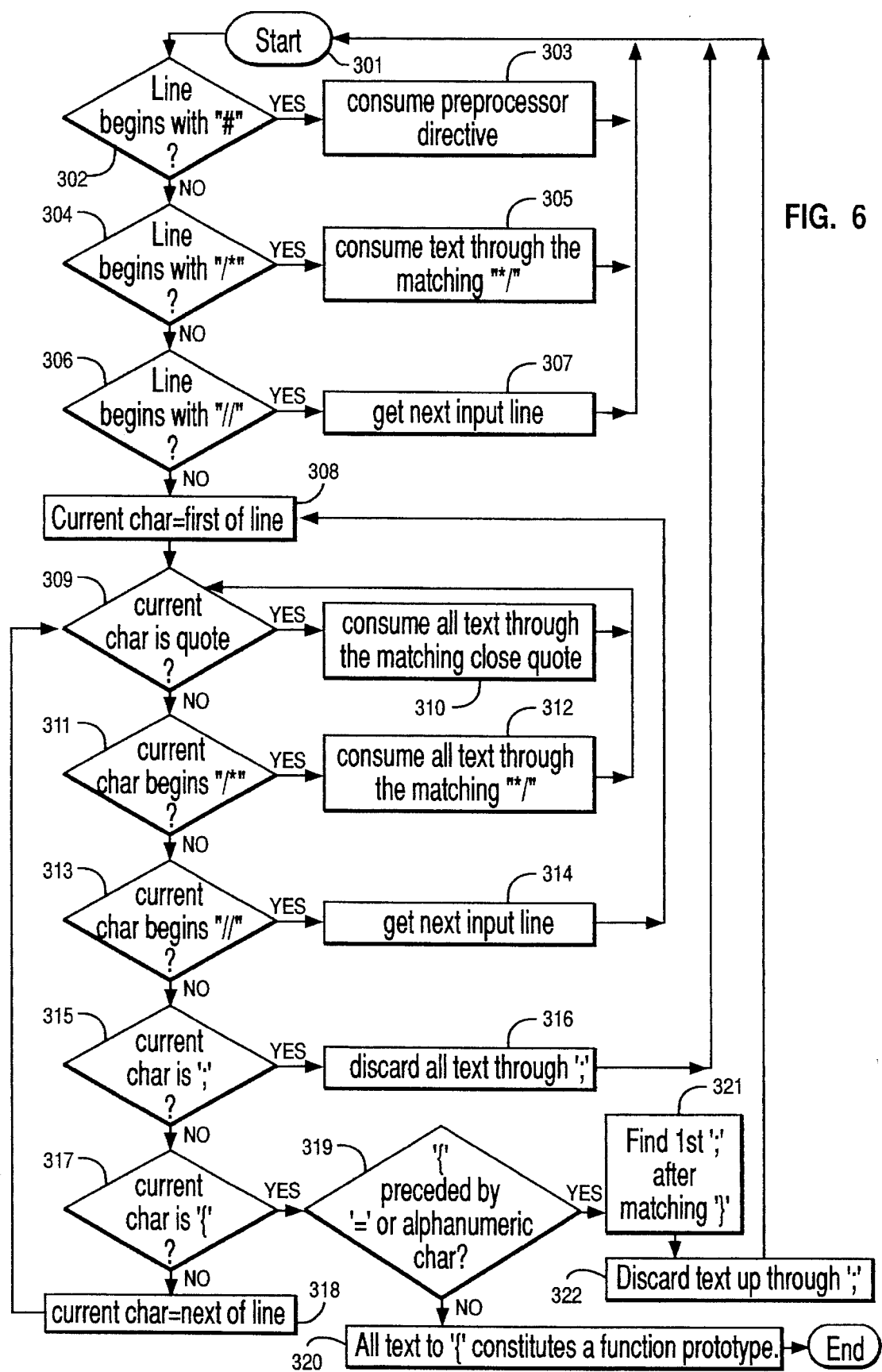
FIG. 6 is a flow diagram of finding a function prototype within a C or a C++ file.
Figure 7:
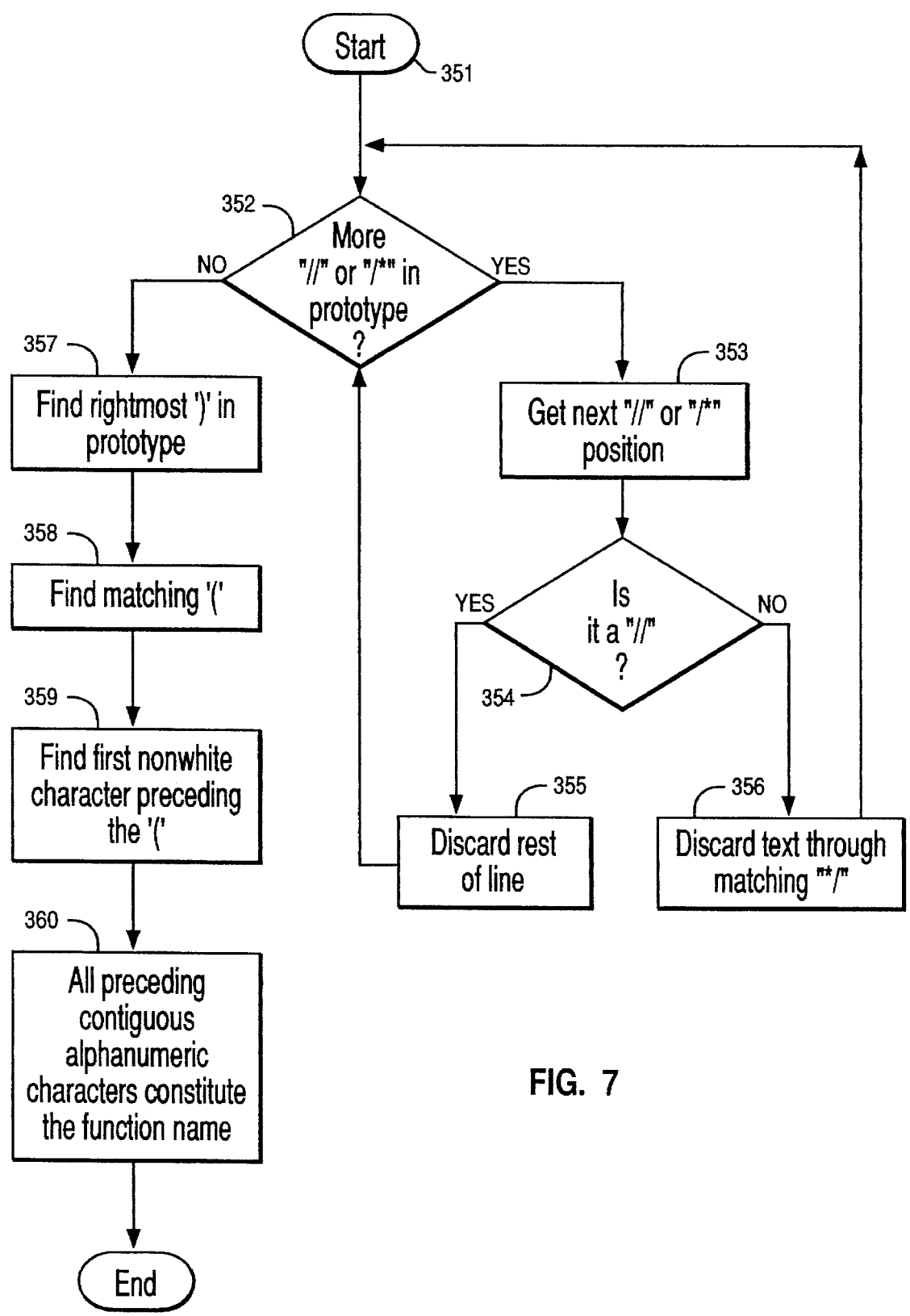
FIG. 7 is a flow diagram of retrieving the name of a function given a prototype.

Referring to FIG. 4, the process starts at step 200 and proceeds immediately to step 202. In step 202, the SOM Compiler generates a new C or C++ implementation template file for the input .idl file, by invoking the SOM ctm (for C) or xtm (for C++) emitter, as requested by the user. In step 203, if a previously-constructed implementation file does not already exist, then the template file created in step 202 becomes the new implementation file and processing ends. If an existing implementation file already exists, processing continues with step 204. In step 204, the emitter determines whether the template file is empty. If not, processing proceeds to step 205. In steps 205, 206 and 207, a linked list of function names appearing in the template file which was constructed in step 202 is built. In step 205, the next function prototype in the template file is found. This process is depicted in FIG. 6. In step 206, the name of the function is extracted from the function prototype. This process is depicted in FIG. 7. In step 207, the function name is added to the head of the linked list. Processing then returns to step 204 until the end of the template file is reached.

In step 208, the emitter determines whether the existing implementation file is empty. If not, steps 209–212 are repeated until the end of the existing implementation file is reached. In these steps, the emitter marks the list of function names constructed in steps 205–207 so that all names that also appear in the existing implementation file are marked as FOUND. In step 209, the next function prototype in the existing implementation file is found. In step 210, the name of the function is extracted from the function prototype. In step 211, if the name is found in the linked list constructed in steps 205–207, then the name is marked as FOUND in step 212. Processing then returns to step 208 until the end of the existing implementation file is reached. The existing implementation file is then rewound for a second pass in step 213.

In step 214, the emitter determines whether the existing implementation file is empty. If not, steps 215–219 are repeated until the end of the file is reached. In step 215, the next function prototype in the existing implementation file is found. Comments preceding the function prototype are retained for processing in steps 218 and 219. In step 216, the name of the function is extracted from the function prototype. In step 217, if the name is found in the linked list constructed in steps 205–207, i.e., if the function also occurs in the new template file, then the emitter updates the function prototype in step 218 depicted in FIG. 5. Otherwise, the function is output, along with any comments associated with it, from the implementation file to the new output file, in step 219. Control then returns to step 214 until the end of the existing implementation file is reached.

In step 220, the emitter transfers from the implementation file to the output file all nonfunction constructs following the last function in the existing implementation file. In the remaining steps, the emitter determines which function names on the linked list which functions in the template file generated in step 202 have not yet been transferred to the output file, and outputs them. These functions are those at the end of the template file, i.e., at the beginning of the linked list not marked as FOUND. In step 221, the emitter determines whether any names at the beginning of the list are not marked as FOUND. If not, processing ends. Otherwise, the emitter finds the last name on the list not marked as FOUND and not preceded by any functions marked as FOUND. In step 222, the emitter tests whether the next name is FOUND; if so, then control proceeds to step 224. Otherwise, the emitter examines the next name on the list in step 223, and returns to step 222 to retest, and so on until the emitter has reached a name such that the name following it on the list is marked FOUND.

In step 224, the function corresponding to the current name is transferred from the template file to the output file, the new implementation. In the remaining steps, the emitter outputs the functions corresponding to all names the precede the current name on the list. This can be done using back pointers in the linked list or by using a recursive function. This implementation uses a recursive function. In step 225, the emitter determines whether it has reached the beginning of the list. If so, processing terminates. Otherwise, the emitter goes back to the previous item on the list in step 226 and then returns to step 224, until all preceding list elements have been processed.

Figure 5:
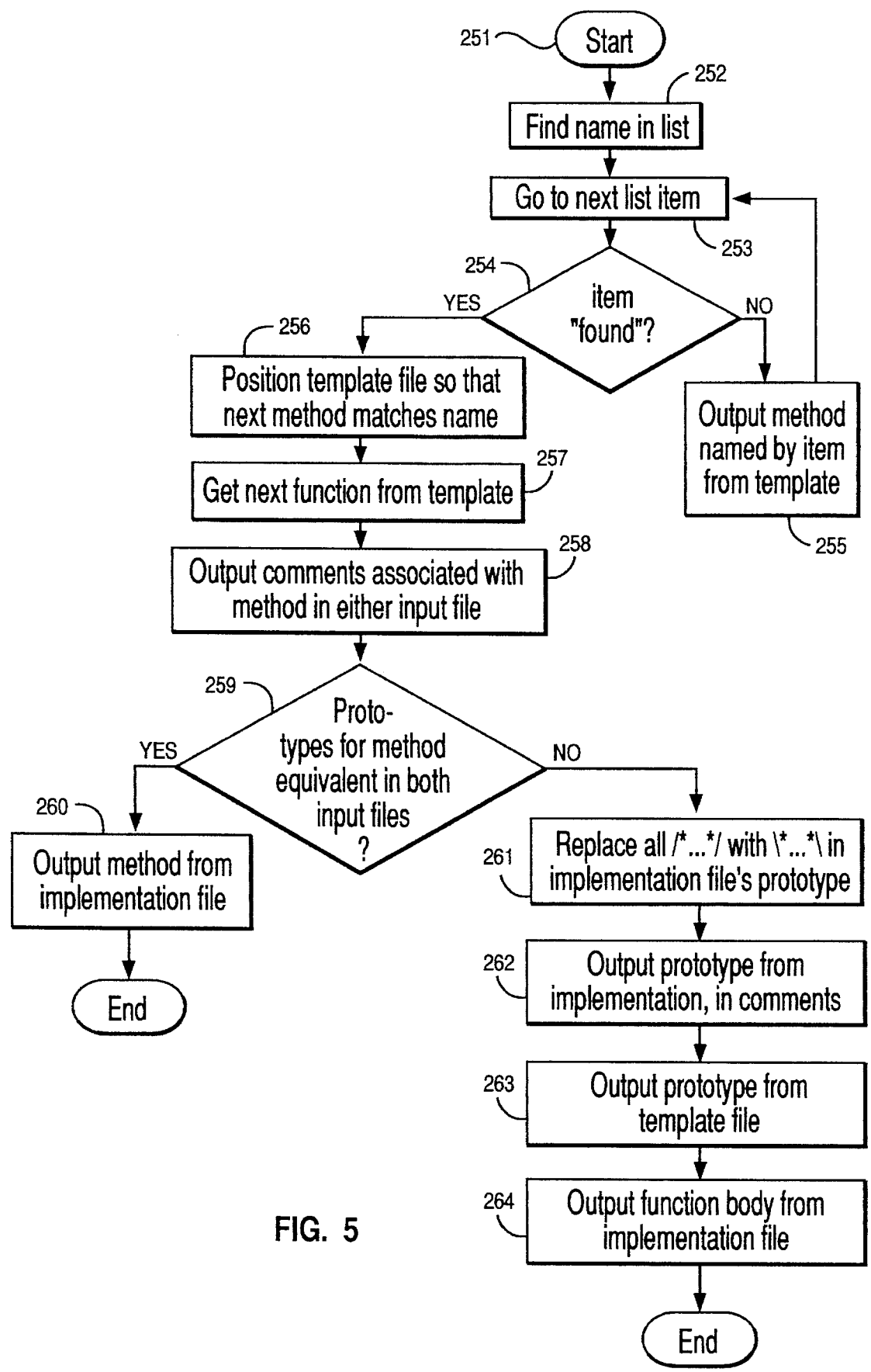
FIG. 5 is a flow diagram of updating a method prototype.

FIG. 5 depicts how the emitter updates a method function prototype in the output file when the function appears in both the template file and the existing new implementation file. When the function prototypes are not equivalent, the prototype found in the template file is used, although the existing prototype is retained in comments. The body of the function found in the existing implementation file is retained, however, even if the prototype has been changed.

The process starts at step 251 and proceeds immediately to step 252. In step 252, the emitter finds the name of the function determined using the procedure shown in FIG. 6 in the linked list of function names. In step 253, the emitter gets the next name on the list. This name will be the name of the function that precedes the given function in the template file. In step 254, the emitter determines whether that name is marked FOUND and whether the function also appears in the implementation file. If not, then in step 255 the emitter transfers the function corresponding to that function name from the template file to the output file and returns to step 253. This repeats until all functions preceding the given function in the template file that do not appear in the existing implementation file are transferred to the output file. Control then proceeds to step 256.

In step 256, the emitter positions the template file so that the next function to be read is the one corresponding to the given function. This step is done by reading functions from the template file until the last function encountered is the one that follows the given function in the linked list of function names. In step 257, the emitter gets the next function from the template file as described in FIG. 6, retaining all comments that precede the function, for processing in step 258. In step 258, the emitter transfers to the output file any comments associated with the function in either the template file or the implementation file. Recall that these comments were retained from the existing implementation file as shown in FIG. 4 and from the template file as shown in step 257 of this figure.

In step 259, the emitter determines whether the prototypes for the method are equivalent in both input files, the template file and the implementation file. The prototype from the template file was obtained in step 257, and the prototype from the implementation file was obtained as shown in FIG. 3. If the prototypes are equivalent, then the function is transferred from the existing implementation file to the output file in step 260 and processing terminates. Otherwise, if the prototypes are not equivalent, the emitter in steps 261–264 revises the existing function prototype to match the prototype in the template file. Before replacing the existing prototype, the emitter "comments out" the existing prototype. Before the prototype can be commented out, however, the comments embedded in it must be altered, because the C language does not allow nested comments. Hence, the emitter in step 261 replaces comments characters in the existing prototype with different characters, then the emitter in step 262 comments out the existing prototype (the prototype found in the existing implementation file) and outputs this commented-out prototype to the output file. In step 263 the emitter transfers the new function prototype found in the template file, obtained in step 257 to the output file. In step 264, the emitter transfers the body of the function from the existing implementation file to the output file. Following step 264, processing terminates.

FIG. 6 shows how the emitter finds in a C or C++ module the next function prototype. Processing begins at step 301 and proceeds immediately to step 302. The algorithm shown assumes that the "current line" begins immediately with the text to be examined, i.e. any characters on the line belonging to the previous function have been removed. In step 302, the emitter determines whether the current line begins with the "#" character, except for leading whitespace (indicating a preprocessor directive). If so, the emitter consumes the directive as shown in step 303 and returns to step 301. Otherwise, if the emitter determines in step 304 whether the current line begins with the characters "/*", except for leading whitespace, indicating a comment. If so, the emitter in step 305 consumes all text up through the matching "*/" characters and returns to step 301. In step 306, the emitter determines in step 306 whether the current line begins with the characters "//", except for leading whitespace, indicating a C++ line comment. If so, the emitter in step 307 gets the next input line and continues at step 301. Otherwise, the emitter in step 308 starts examining the current line at the first character. At this point, it is assured that the next construct in the file is some sort of definition. The remaining steps distinguish between function definitions and other kinds of definitions, such as type or data definitions.

In step 309, if the current character is a quote, signifying a string or character literal, the emitter in step 310 consumes all text through the matching closing quote character, reading new lines as necessary, and returns to step 309. As it is searching for the matching quote, the emitter ignores back-quoted quote characters. In step 311, if the current character is a '/' character followed by a '*' character, signifying a comment, the emitter in step 312 consumes all text through the matching "*/" characters, reading new lines as necessary, and returns to step 309. In step 313, if the current character is a '/' character followed by a '/' character, signifying a C++ line comment, the emitter in step 314 gets the next line of input and returns to step 308. In step 315, if the current character is a semicolon, this signifies the termination of a non-function definition or a "forward" function definition, neither of which is of interest to the emitter. Thus, the emitter in step 316 ignores all preceding text up through the semicolon and begins again at step 301.

In step 317, unless the current character is a left brace character, the emitter proceeds to step 318 where it moves to the next character of input and returns to step 309. If the current characters is a left brace, however, the emitter in step 319 determines whether the left brace is preceded by an assignment operator or an alphanumeric character. If not, then the brace signals the beginning of a function body, and the emitter in step 320 returns all text beginning at the point at which step 308 was first executed and ending with the character preceding the opening brace.

If the opening brace is preceded by an assignment operator, with only whitespace intervening, then the brace is part of a variable initialization rather than a function definition. In that case, the emitter in step 321 finds the end of the variable initialization signaled by the first semicolon following the matching right brace and in step 322 the emitter ignores all preceding text up through the semicolon and begins again at step 301. In searching for the matching right brace, all nested comments, literals, and blocks are ignored. If the opening brace is preceded by an alphanumeric character, with only whitespace intervening, then the brace is part of a struct, union, or enum type definition rather than a function definition. A brace within a type definition is preceded by an identifier, which ends in an alphanumeric character, while a brace within a function definition is preceded by a parenthesis or bracket. In that case, the emitter in step 321 finds the end of the type definition and in step 322 the emitter ignores all preceding text up through the semicolon and begins again at step 301. In searching for the matching right brace, all nested comments, literals, and blocks are ignored.

FIG. 7 shows how the emitter finds the function name given a function prototype. Processing begins at step 351 and proceeds immediately to step 352. In steps 352–356, the emitter removes all comments from the function prototype in a working copy. In step, 352, the emitter determines whether more comments are found in the prototype. If not, control goes to step 357. Otherwise, the emitter in step 353 gets the position of the next comment characters. In step 354 the emitter determines which kind of comment has been found; if the comment is a C++ line comment, signified by "//", then the emitter in step 355 discards the rest of the line and resumes with step 352. Otherwise, the emitter discards all text up through the matching "*/" characters and resumes with step 352.

In step 357, the emitter finds the rightmost right parenthesis in the prototype, using a standard string search function. This parenthesis marks the end of the function's parameter list. In step 358, the emitter finds the left parenthesis matching that right parenthesis, ignoring any nested parenthesis pairs intervening. This parenthesis marks the beginning of the function's parameter list. In step 359, the emitter finds the first non-whitespace character preceding the left parenthesis found in step 358. This is the last character of the function name. In step 360, the emitter returns as the function name all the contiguous alphanumeric characters up to the character found in step 59.

Figure 8:
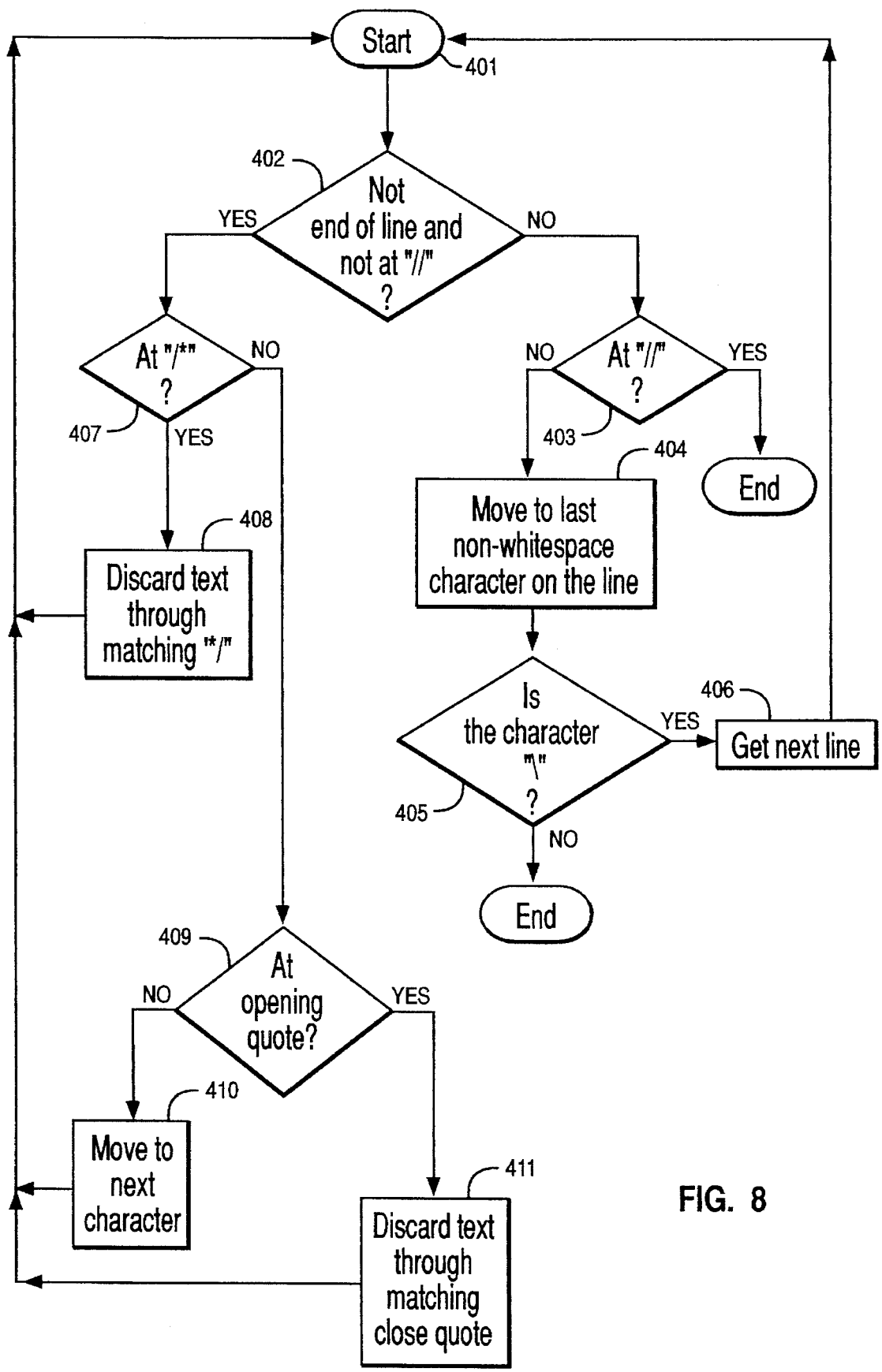
FIG. 8 is a flow diagram of consuming a preprocessor directive.

FIG. 8 shows how the emitter consumes a preprocessor directive from an input C/C++ module. Processing begins at step 401 and proceeds immediately to step 402.

In step 402, the emitter determines whether it is at the end of a line or at a C++ line comment (signaled by "//"). If so, then in step 403 the emitter determines whether it is at a C++ line comment. If so, then processing terminates because preprocessor directives end at the end of the line, and the line comment extends to the end of the line. Otherwise, the emitter in step 404 moves to the last non-whitespace character on the line, to check whether the line ends with a continuation character. In step 405, the emitter checks for a continuation character (a backslash). If none is found, processing terminates because the preprocessor directive terminates at the end of the line. If a continuation character is found, then the emitter in step 406 gets the next input line and continues at step 401.

At step 407, the emitter determines whether the current character marks the beginning of a comment (signaled by "/*"). If so, then the emitter in step 408 discards all text through the matching "*/" characters and control returns to step 401. Otherwise, the emitter at step 409 determines whether the current character is the beginning of a string or character literal. If so, then the emitter in step 811 consumes all text through the matching close quote character and control returns to step 401. Otherwise, the emitter proceeds to the next character in step 410 and control returns to step 401. The following pseudocode summarizes the process depicted in FIGS. 4 through 8 and discussed above.

```
Repeat {
    Find the next method function on in the existing
    implementation file, saving the comments immediately
    preceding it.
        (Other programming constructs encountered, such as
        preprocessor directives, delcarations, typedefs,
        etc., are transferred directly to the new
        implementation file without modification.)
    If the method is in the methods list (the list of
    methods in the newly generated template) Then {
        Position the methods list at that method ("the
            current method").
        Transfer from the template file to the new
            implementation file all methods that follow the
            current method on the methods list and that are
            unmarked (that do not occur in the
            implementation file).
        Position the template file so that the next function
            read will be the current method.
        Find the next method function in the template file,
            saving the comments immediately preceding it.
        Transfer to the new implementation file all comments
            associated with the method in either the
            existing implementation file of the newly
            generated template.
        If the method's prototype in the template file
            matches the method's prototype in the existing
            implementation file Then transfer the method
            function from the existing implementation file
            to the new file.
        Else {
            Put the method function prototype from the
                existing implementation file in
                comments into the new file.
            Add a comment to the new file that a
                method function prototype has been
                altered.
```

```
        Put the method function prototype from the
            template file into the new file.
        Put the method function body from the
            existing implementation file into the
            new file.
        }
    }
    Else /* the method does not occur in the template
        file */
        Transfer the method function, along with its
            associated comments, from the existing
            implementation file to the new file.
}
Until the end of the implementation file is encountered.
Transfer to the new file all nonfunction constructs that
    followed the last function in the existing
    implementation file.
If the first item on the method list is not marked as
    found in the existing implementation file,
    Then emit that method function from the template
        file to the new implementation file, after
        first emitting any unmarked method functions
        that follow it in the list.
```

While the invention has been described with respect to particular embodiments above, it will be understood by those skilled in the art that modifications may be made without departing from the spirit and scope of the present invention. These embodiments are for purposes of example and illustration only and are not to be taken to limit the scope of the invention narrower than the scope of the appended claims.

We claim:

1. A system for compiling versions of a file in a first and second programming language into a merged output file in the a second language in a computer system comprising:

means for modifying an original file in the first programming language to create a derivative file in the first programming language;

means for translating the original and derivative files in the first language into original and derivative output files in the second language in a computer memory;

means for modifying and storing the original output file in the second language in the computer memory according to user input to create a modified original output. file,; and means for interleaving code segments from the modified original and derivative output files and storing the interleaved code segments as the merged output file in the computer memory so that code segments from each of the modified original and derivative output files which correspond to each function name are stored together.

2. The system as recited in claim 1, wherein the interleaving means further comprises:

means for parsing the modified original and derivative output files to create a list of function names which appear in both output files, the function names in the list including and ordered according to an order in which function names occur in a first one of the modified original and derivative output files;

means for transferring code segments from the modified original and derivative output files according to the method:

sequentially comparing function names in an order in which the function names occur in a second one of the modified and unmodified output files to the list;

for each function name in the second one of the modified original and derivative output files, storing in the merged output file a corresponding code segment from the second one of the first and second output files;

for each function name in both the second one of the modified original and derivative output files and the list, storing in the merged output file portions of corresponding code segments unique to the modified first and second output files;

for each function name unique to the list, storing in the merged output file a corresponding code segment from the first one of the modified original and derivative output files.

3. The system as recited in claim 1 wherein the interleaving means further comprises:

means for marking code segments from the modified original and derivative output files in the merged output file to identify from which output file a given code segment originated.

4. A method for compiling two versions of a file in a first and second programming language into a merged output file in the second language comprising the steps of:

translating an original input file in the first language into an original output file in the second language in a computer memory;

modifying and storing the original output file in the second language in the computer memory according to user supplied input to create a modified original output file;

translating a derivative input file in the first programming language into a derivative output file in the second programming language, the derivative input file another version of the original input file; and interleaving code segments from the modified original and derivative output files and storing the code segments from each of the modified original and derivative output files so that code segments which correspond to each function name are stored together.

5. The method as recited in claim 4, wherein the interleaving step further comprises the steps of:

parsing the modified original and derivative output files to create a list of function names which appear in both the modified output files, the function names in the list including and ordered according to an order in which function names occur in a first one of the modified oriqinal and derivative, output files;

transferring code segments from the modified original and derivative output files according to the method:

sequentially comparing function names in an order in which the function names occur in a second one of the modified original and derivative output files to the list;

for each function name in the second one of the modified original and derivative output files, storing in the merged output file a corresponding code segment from the second one of the modified first and second output files;

for each function name in both the second one of the modified original and derivative output files and the list, storing in the merged output file portions of corresponding code segments unique to the modified first and second output files;

for each function name unique to the list, storing in the merged output file a corresponding code segment from the first one of. the modified original and derivative output files.

6. The method as recited in claim 5 wherein the interleaving step further comprises the step of marking code segments from the modified original and derivative output files in the merged output file-to identify from which output file a given code segment originated.

7. A method for compiling an updated file in a first programming language into a new file in a second programming language, the method including a merge of two translated files in the second programming language, a newly translated file resulting from translation of the updated file and a previously translated file resulting from translation of a prior version of the updated file, the previously translated file modified in its translated form by a user, the method practiced in a memory of a computer system, comprising the steps of:

translating the updated file to create the newly translated file;

retreiving from the memory the previously translated file;

responsive to the creation of the newly translated file, searching the newly and previously translated files to create a list of function names ordered as they occur in the newly translated file marking common module names which occur in both the newly and previously translated files;

sequentially comparing function names in an order in which the function names occur in the previously translated file to the list;

for each function name in the previously translated file, storing in the new file a corresponding code segment from the previously translated file;

for each function name in both the previously translated file and the list, storing in the new file corresponding code segment unique to the newly and previously translated files;

for each function name unique to the list, storing in the new file a corresponding code segments from the newly translated file.

8. A method for compiling an updated file in a first programming language into a new file in a second programming language, the method including a merge of two translated files in the second programming language, a newly translated file resulting from translation of the updated file and a previously translated file resulting from translation of a prior version of the updated file, the previously translated file modified in its translated form in response to user input, the method practiced in a memory of a computer system, comprising the steps of:

sequentially comparing function names as the function names occur in the newly and previously translated files;

for each function name as ordered in the previously translated file, storing in the new file a corresponding code segment from the previously translated file;

for each function name as ordered in the previously translated file also present in the newly translated file, storing in the new file corresponding code segments unique to the newly and previously translated files;

for each function name unique to the newly translated file, storing in the new file a corresponding code segment from the newly translated file.

9. The method as recited in claim 8 further comprising the step of:

changing a set of characters indicating comments from a selected one of the newly and previously translated files; and storing comments from the newly and previously translated files in the new file including the changed set of characters.

10. The method as recited in claim 8 further comprising the step of for each function name automatically inserting a comment that a code segment has been altered if corresponding code segment are found in both the newly and previously translated files.

11. The method as recited in claim 8 wherein the newly and previously translated files are method implementations for a class object and the portions unique to the previously translated file are programmer added application specific code and the portions unique to the newly translated file are additional method implementations for the class object.

12. The method as recited in claim 8 further comprising the step of changing the corresponding code segment in the previously translated file into a comment format if the corresponding code segments are found in both the newly and previously translated files.

13. A computer system for compiling an updated file in a first programming language into a new file in a second programming language wherein two translated files in the second programming language are merged, a newly translated file resulting from translation of the updated file and a previously translated file resulting from translation of a prior version of the updated file, the previously translated file modified in its translated form in response to user input, the method practiced in a memory of a computer system, comprising the steps of:

means for translating the updated file to create the newly translated file;

means for searching newly and previously translated files to create a list of function names ordered as the function names occur in the newly translated file marking common function names which occur in both the newly and previously translated files;

means for sequentially comparing function names in an order in which the function names occur in the previously translated file to an order in which the function names occur in the list;

for each function name in the previously translated file, means for storing in the new file a corresponding code segment from the previously translated file;

for each module name in both the previously translated file and list, means for storing in the new file corresponding code segments unique to the newly and previously translated files;

for each function name unique to the list, means for storing in the new file a corresponding code segment from the newly translated file.

14. A computer memory readable by a processor and tangibly embodying a program of instructions executable by the processor to perform a method the method for compiling an updated file in a first programming language into a new file in a second programming language the method including a merge of two translated files in the second programming language, a newly translated file resulting from translation of the updated file with a previously translated file resulting from translation of a prior version of the updated file, the previously translated file modified in its translated form in response to user input, the method comprising the steps of:

sequentially comparing function names as the function names occur in the newly and previously translated files;

for each function name as ordered in the previously translated file, storing in the new file a corresponding code segment from the previously translated file;

for each function name as ordered in the previously translated file also present in the newly translated file, storing in the new file portions of corresponding code segments unique to the newly and previously translated files;

for each function mane unique to the newly translated file, storing in the new file a corresponding code segment from the newly translated file.

\* \* \* \* \*